United States Patent
Ahn

(10) Patent No.: US 7,434,615 B2
(45) Date of Patent: Oct. 14, 2008

(54) APPARATUS FOR PREVENTING POLLUTION OF SUBTERRANEAN WATER

(76) Inventor: Guen Mook Ahn, 313-606 Sangnokmaeul Apartment, Jeongja-dong 121, Bundang-gu, Seongnam-shi, Gyeonggi-do 463-786 (KR)

( * ) Notice: Subject to any disclaimer, the term of this patent is extended or adjusted under 35 U.S.C. 154(b) by 141 days.

(21) Appl. No.: 10/590,501

(22) PCT Filed: Feb. 25, 2005

(86) PCT No.: PCT/KR2005/000531

§ 371 (c)(1),
(2), (4) Date: Aug. 24, 2006

(87) PCT Pub. No.: WO2005/083187

PCT Pub. Date: Sep. 9, 2005

(65) Prior Publication Data

US 2007/0187088 A1    Aug. 16, 2007

(30) Foreign Application Priority Data

Feb. 27, 2004  (KR) .................. 10-2004-0013290
Feb. 18, 2005  (KR) .................. 10-2005-0013626

(51) Int. Cl.
    E21B 43/00    (2006.01)
(52) U.S. Cl. .................................. 166/85.2; 166/86.1
(58) Field of Classification Search ............... 166/85.2, 166/86.1
    See application file for complete search history.

(56) References Cited

U.S. PATENT DOCUMENTS

| | | | | |
|---|---|---|---|---|
| 2,903,067 A | * | 9/1959 | Hall | 166/85.2 |
| 3,270,818 A | * | 9/1966 | Pugh, Jr. | 166/85.2 |
| 3,403,730 A | * | 10/1968 | Williams | 166/85.2 |
| 3,430,697 A | * | 3/1969 | Wellstein | 166/85.2 |
| 4,226,286 A | * | 10/1980 | Cramer | 166/85.2 |
| 4,664,185 A | * | 5/1987 | Barnard | 166/66 |
| 4,850,428 A | * | 7/1989 | Paulus | 166/85.2 |
| 5,669,442 A | * | 9/1997 | Gibson | 166/85.2 |
| 5,934,370 A | * | 8/1999 | Hoeptner, III | 166/50 |

\* cited by examiner

Primary Examiner—Hoang Dang
(74) Attorney, Agent, or Firm—Cantor Colburn LLP

(57) ABSTRACT

Disclosed herein is an apparatus for preventing pollution of a groundwater borehole, which increase water-tightness. The apparatus for preventing pollution of a groundwater borehole has a structure that both sides of an underwater motor pump supported by a first intake pipe having a groundwater borehole for discharging groundwater to the outside are all supported inside a second intake pipe connected with the first intake pipe. The apparatus always maintains balance of the motor pump inside the intake pipes, thereby preventing displacement occurring by supporting only a side of the motor pump like the prior arts, and preventing water leakage and providing watertight efficiency by maintaining the close contact efficiency of an induction pipe connector mounted inside the second intake pipe.

9 Claims, 14 Drawing Sheets

APPARATUS FOR PREVENTING POLLUTION OF SUBTERRANEAN WATER

This application claims priority to PCT International Application, PCT/KR 2005/000531, filed in Feb. 25, 2005, which claims priority to and the benefit of Korean Application No. 10-2004-00 13290filed on Feb. 27, 2004, and Korean Application No. 10-2005-0013626filed on Feb. 18, 2005, in the Korean Patent Office, the entire contents of which are incorporated hereinto by reference.

TECHNICAL FIELD

The present invention relates to an apparatus for preventing pollution of a groundwater borehole, and more particularly, to an apparatus for preventing pollution of a groundwater borehole, which increase water-tightness according to maintenance of balance.

BACKGROUND ART

In general, as well known in the art, a groundwater intake facility has been developed for the purpose of drinking water, agricultural water and industrial water. Korean patent No. 10-0371520 which has been invented by the same inventor as the present invention discloses an apparatus for preventing pollution of a groundwater borehole. FIGS. 1 and 2 are cross-sectional views showing the conventional apparatus for preventing pollution of a groundwater borehole. FIG. 1 is a sectional view of a conventional apparatus for preventing pollution of a groundwater borehole, and FIG. 2 is a partially enlarged view showing a "P" part of FIG. 1.

As shown in the drawings, the conventional apparatus for preventing pollution of a groundwater borehole includes: a first intake pipe 100 buried under the ground for forming a groundwater borehole communicating with a subterranean water layer by penetratingly excavating a base rock under the ground; a second intake pipe 110 having a watertight cover 120 connected with the upper portion of the first intake pipe 100; and a connector 160 mounted on the second intake pipe 110 for supporting a underwater motor pump 144 buried inside the first and second intake pipes 100 and 110, the connector having a discharge path 162 for discharging the groundwater pumped up by the motor pump 144 through a groundwater piping system 150 having an integral water meter 151, a pressure gauge 152, an exhalent device 153 and a non-return valve 154.

When the motor pump 144 is operated, the groundwater collected inside the first intake pipe 100 is pumped up, and then, transferred to a target place through the connector 160 and the groundwater piping system 150. The reference numeral 140 designates a groundwater discharge pipe mounted between the connector and the motor pump 144 in such a manner as to communicate with the discharge path 162, for inducing the groundwater pumped up by the motor pump 144 to the discharge path 162.

However, in such conventional apparatus for preventing pollution of a groundwater borehole, the connector 160 is mounted inside the second intake pipe 110 for supporting only a part of the heavy motor pump 144. So, the conventional apparatus for preventing pollution of a groundwater borehole has a disadvantage in that the pumped groundwater leaks from the discharge path 162 branched from the second intake pipe 110 since a part of the connector 160 mounted on the second intake pipe 110 is displaced from the second intake pipe 110 by load of the motor pump 144 without maintaining water-tightness.

DISCLOSURE OF INVENTION

Accordingly, the present invention has been made in view of the above problems occurring in the prior art, and it is an object of the present invention to provide an apparatus for preventing pollution of a groundwater borehole, which increase water-tightness by adopting a structure for supporting both sides of an underwater motor pump inside intake pipes so as to maintain balance.

Another object of the present invention is to provide an apparatus for preventing pollution of a groundwater borehole, which smoothly pump up water by effectively coping with a change of the inside air according to a change of water level inside the intake pipes.

A further object of the present invention is to provide an apparatus for preventing pollution of a groundwater borehole, which safely manage groundwater by effectively preventing introduction of pollutants into the intake pipes.

A still further object of the present invention is to provide an apparatus for preventing pollution of a groundwater borehole, which can bury pipes under the ground and prevent freezing of the pipes by inducing a discharge direction of groundwater to the outside of a side of the intake pipes through a connector for supporting the underwater motor pump located inside the intake pipes.

According to a first aspect of the present invention, the apparatus for preventing pollution of a groundwater borehole comprising: a first intake pipe for forming a ground water borehole; a second intake pipe fluid-communicatively coupled to the first intake pipe and closing an opening of the first intake pipe; an underwater motor pump located inside the first intake pipe for discharging groundwater from the intake pipes to the outside; an induction pipe connector mounted inside the second intake pipe and connected with the motor pump for supporting the motor pump, the induction pipe connector having a discharge path for discharging the groundwater pumped up by the motor pump to the outside of a side of the second intake pipe; fixing means respectively mounted on a side surface of the induction connector and a side surface of the second intake pipe directed to each other for supporting the induction pipe connector to the second intake pipe in balance; and a pressure controlling part mounted on the outer circumferences of the intake pipes in such a manner as to communicate with the second intake pipe via a portion adjacent to the induction pipe connector for uniformly controlling the inside pressure of the intake pipes.

The fixing means includes a first protrusion protruding from the induction pipe connector and having a bended front end, and a first support protrusion protruding from the second intake pipe and having a bended front end corresponding and matched with the bended front end of the first protrusion.

Furthermore, the fixing means includes a second protrusion protruding from the induction pipe connector and having an inclined front end, and a second support protrusion protruding from the second intake pipe and having an inclined front end corresponding with the inclined front end of the second protrusion in surface contact with each other.

In addition, the pressure controlling part includes: an air suction valve connected with the second intake pipe and having an automatic air suction valve for inhaling and supplying the outside air into the intake pipes in order to relieve a vacuum condition due to a drop of the water level inside the first intake pipe, and an exhaust valve 280b connected with the second intake pipe in parallel with the air suction valve and having an automatic valve for discharging the inside air of a high pressure state inside the intake pipes to the outside in order to relieve high pressure due to a rise of the water level inside the first intake pipe.

Moreover, the air suction valve further includes a first ball top connected with the automatic air suction valve and having a first float for closing an opened air path of the automatic air suction valve according to the water level of the outside, and a gasproof filter connected with the first ball top.

In another aspect of the present invention, the apparatus for preventing pollution of a groundwater borehole comprises: a first intake pipe for forming a groundwater borehole; a second intake pipe fluid-communicatively coupled to the first intake pipe and closing an opening of the first intake pipe; an underwater motor pump located inside the first intake pipe for discharging groundwater from the intake pipes to the outside; an induction pipe connector mounted inside the second intake pipe and connected with the motor pump for supporting the motor pump, the induction pipe connector having a discharge path for discharging the groundwater pumped up by the motor pump to the outside of a side of the second intake pipe; fixing means respectively mounted on a side surface of the induction connector and a side surface of the second intake pipe directed to each other for supporting the induction pipe connector to the second intake pipe in balance; and a second ball top mounted inside the upper portion of the second intake pipe adjacently to the induction pipe connector for connecting the inside and outside of the second intake pipe in order to uniformly control the inside pressure of the intake pipes.

The fixing means includes a first protrusion protruding from the induction pipe connector and having a bended front end, and a first support protrusion protruding from the second intake pipe and having a bended front end corresponding and matched with the bended front end of the first protrusion.

Furthermore, the fixing means includes a second protrusion protruding from the induction pipe connector and having an inclined front end, and a second support protrusion protruding from the second intake pipe and having an inclined front end corresponding with the inclined front end of the second protrusion in surface contact with each other.

Moreover, the ball top includes a hollow casing mounted on the inner wall surface of the second intake pipe and having an air path for connecting the inside and outside of the second intake pipe, and a second float located inside the casing and having a number of holes formed on the outer circumference thereof for closing the air path of the opened casing according to the water level of the outside, the holes communicating with the air path of the casing.

BEST MODE FOR CARRYING OUT THE INVENTION

Figure 1:
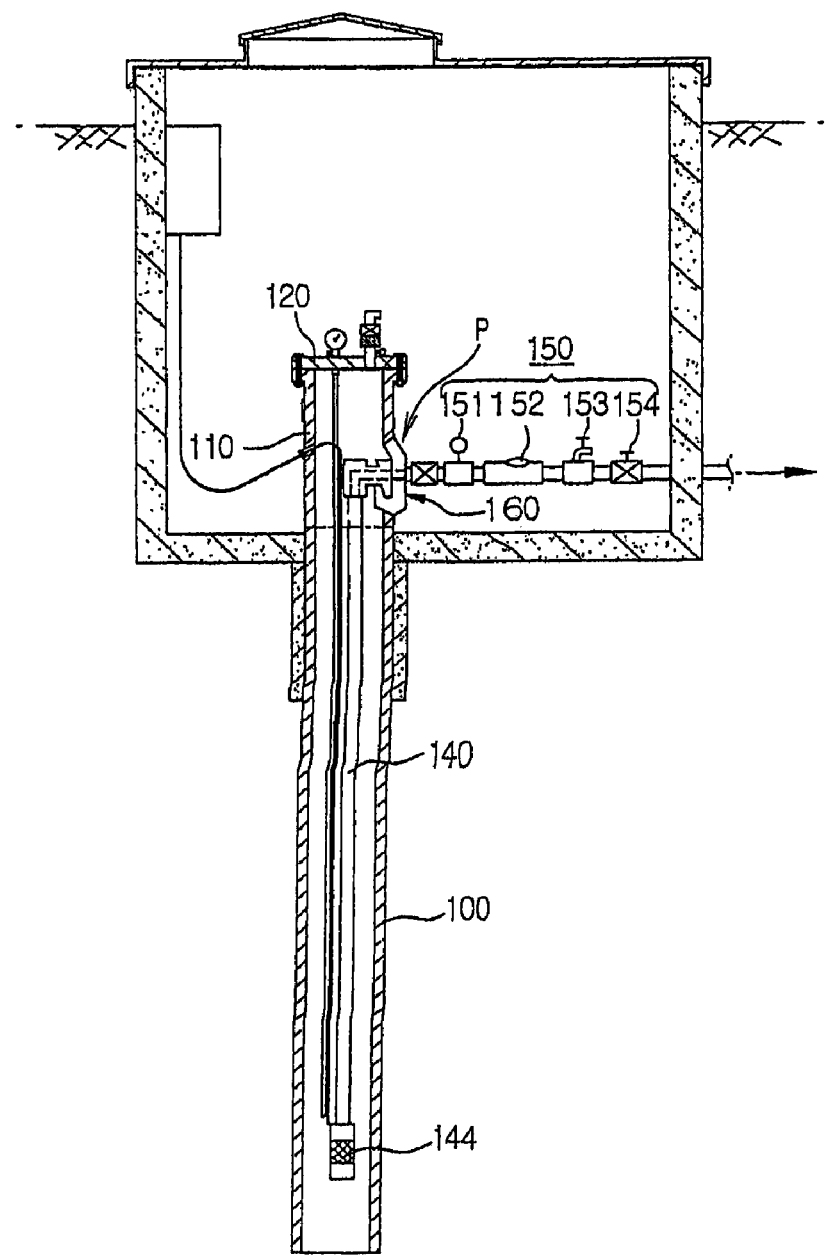
FIG. 1 is a sectional view of a conventional apparatus for preventing pollution of groundwater borehole.
Figure 2:
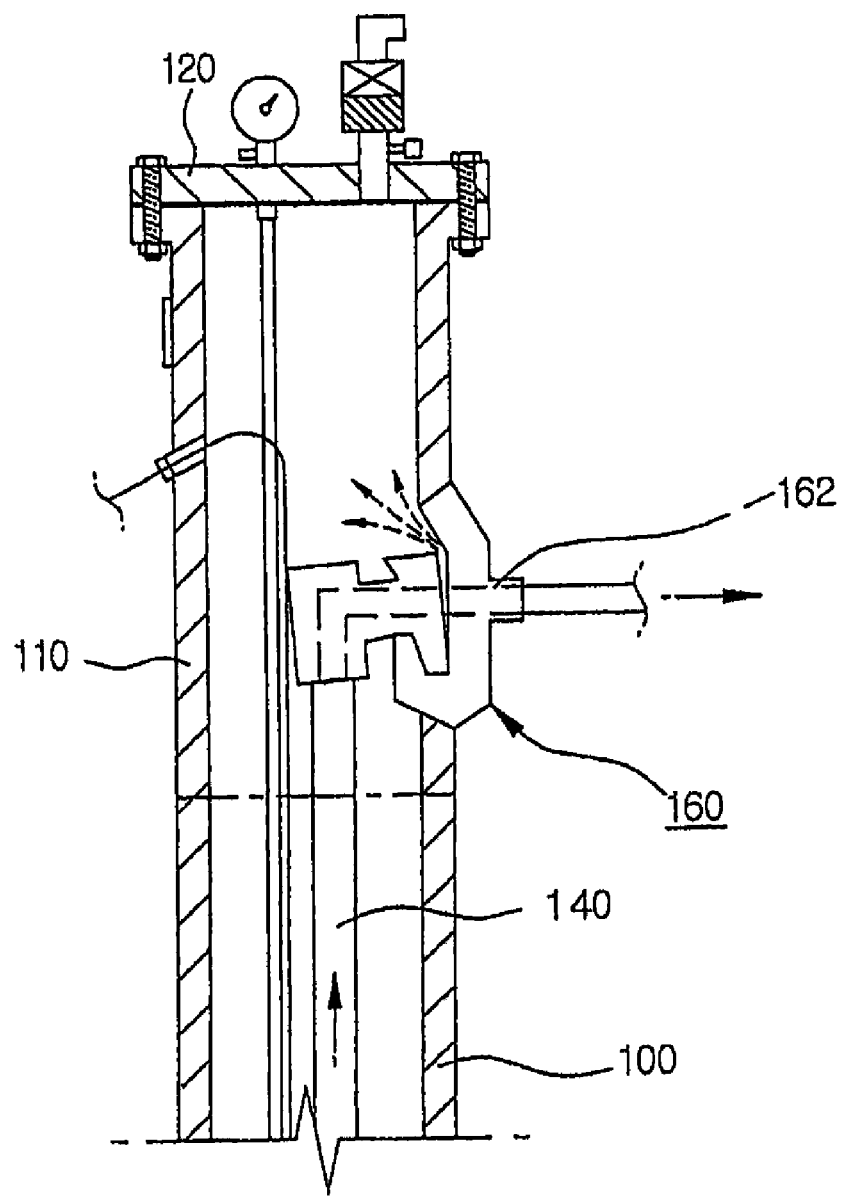
FIG. 2 is a partially enlarged view showing a "P" part of FIG. 1.

The present invention will now be described in detail in connection with preferred embodiments with reference to the accompanying drawings. In drawings, the same reference numerals designate the same parts of the present invention.

Figure 3:
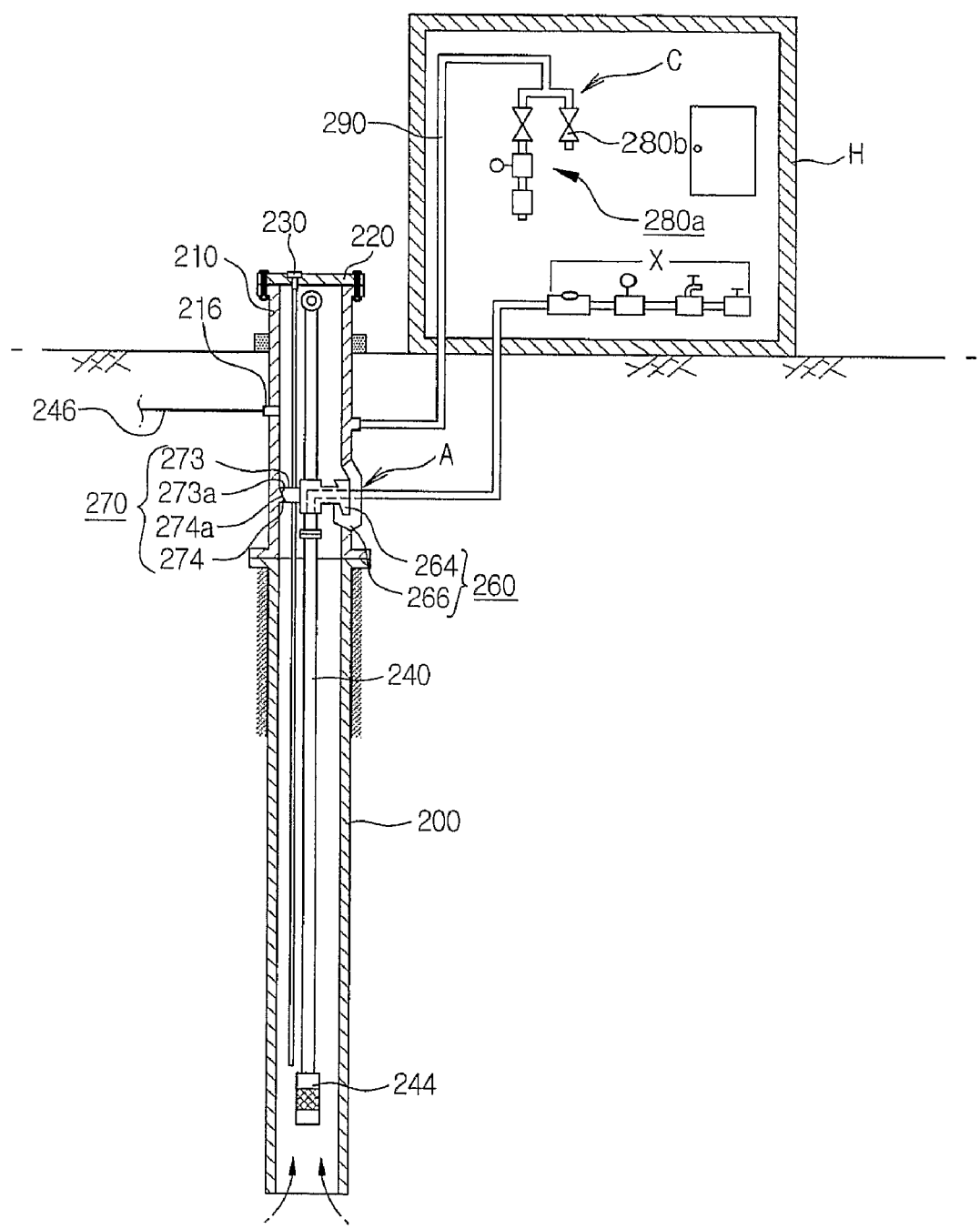
FIG. 3 is a sectional view of an apparatus for preventing pollution of a groundwater borehole according to a first preferred embodiment of the present invention.
Figure 4:
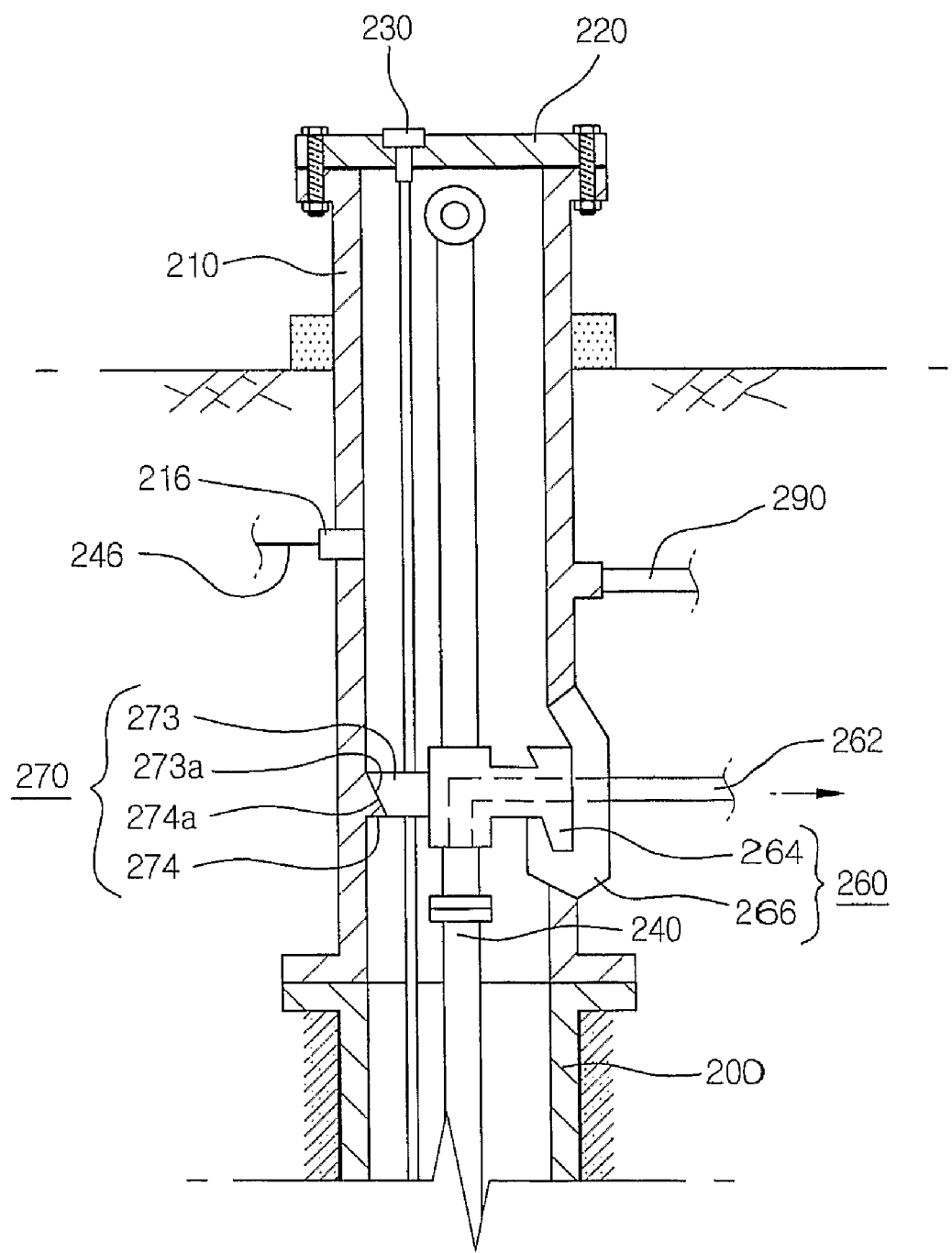
FIG. 4 is a partially enlarged view showing an "A" part of FIG. 3.
Figure 5:
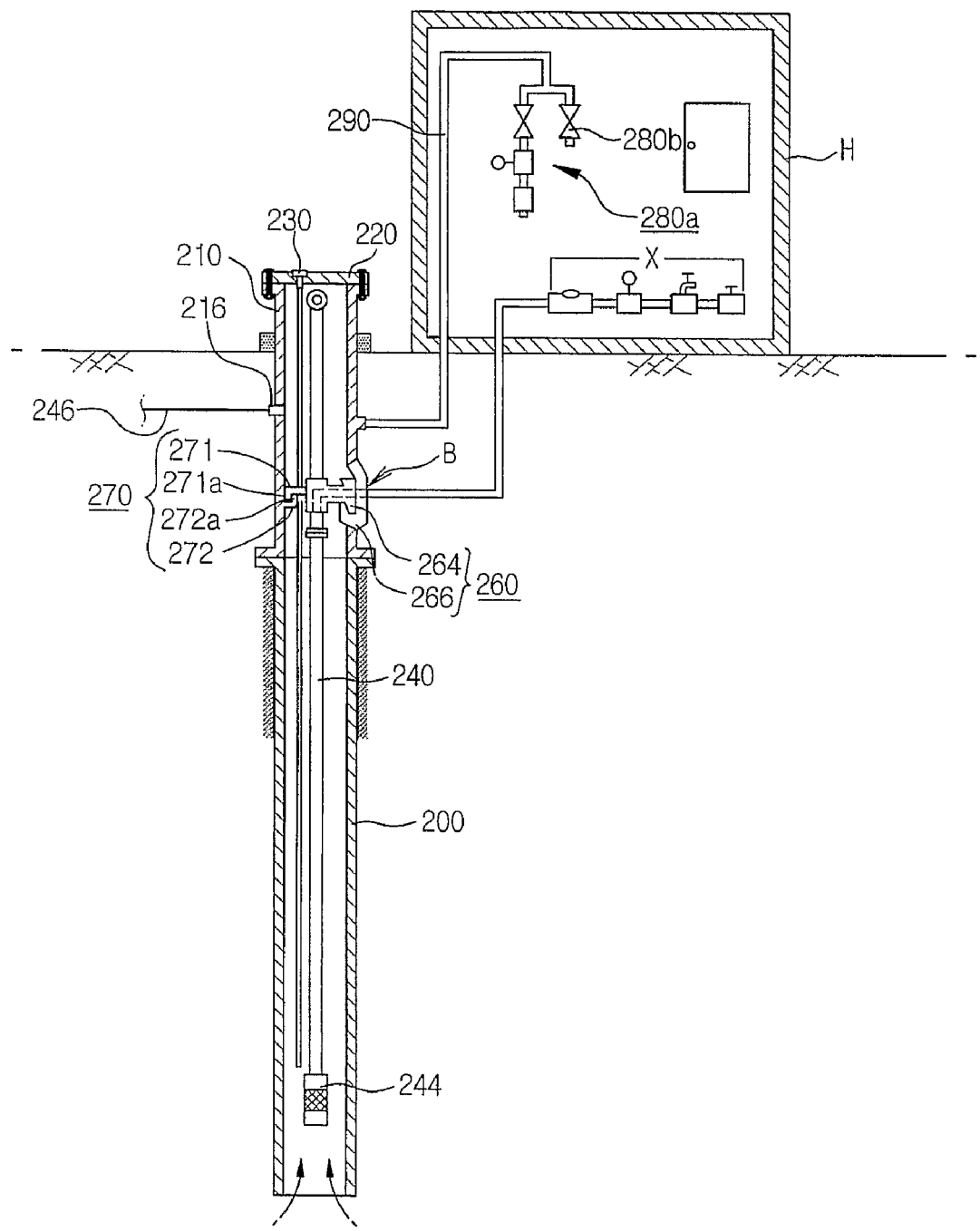
FIG. 5 is a sectional view of a modification of the apparatus for preventing pollution of a groundwater borehole according to the first preferred embodiment of the present invention.
Figure 6:
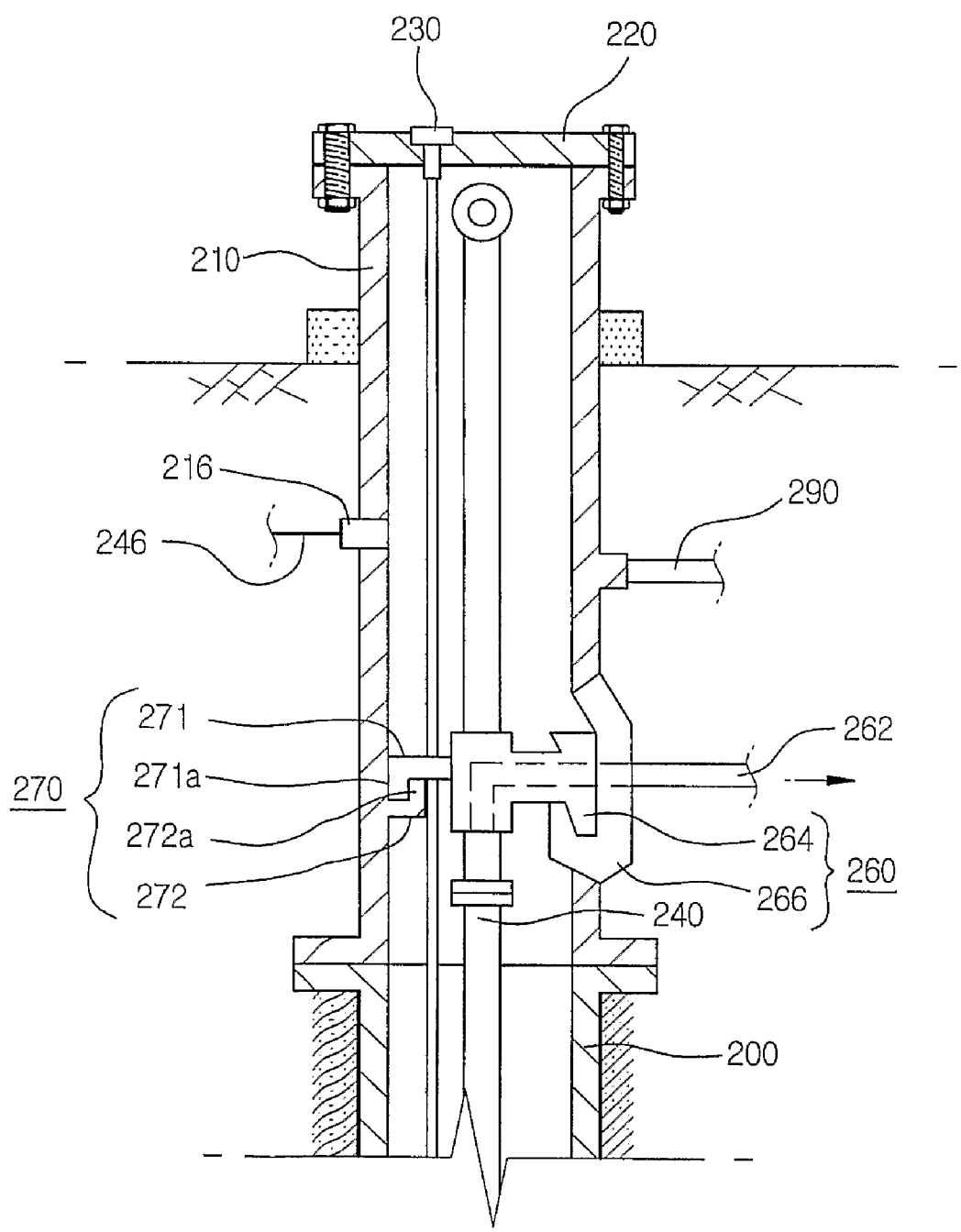
FIG. 6 is a partially enlarged view showing a "B" part of FIG. 5.
Figure 7:
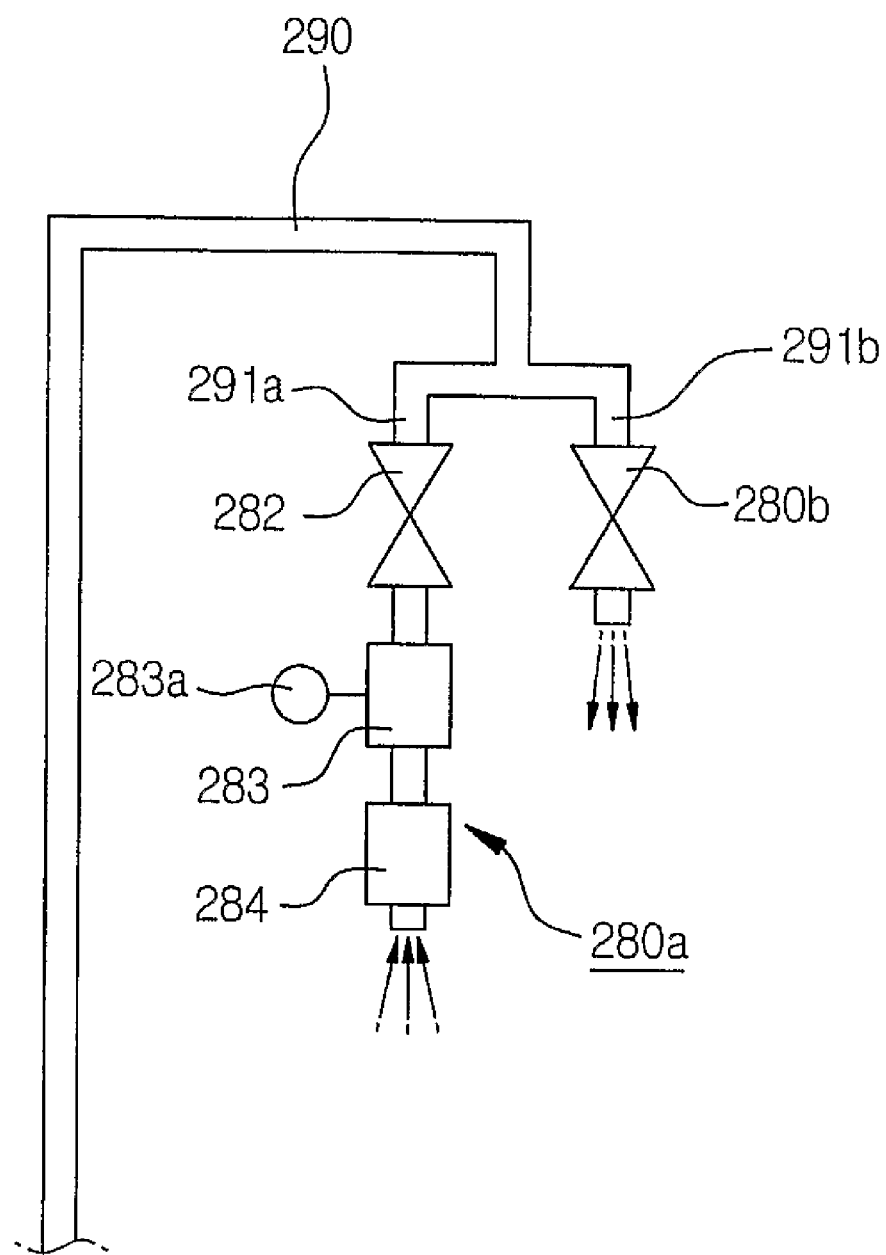
FIG. 7 is a partially enlarged view showing a "C" part of FIG. 3.

FIG. 3 is a sectional view of an apparatus for preventing pollution of a groundwater borehole according to a first preferred embodiment of the present invention, FIG. 4 is a partially enlarged view showing an "A" part of FIG. 3, FIG. 5 is a sectional view of a modification of the apparatus for preventing pollution of a groundwater borehole according to the first preferred embodiment of the present invention, FIG. 6 is a partially enlarged view showing a "B" part of FIG. 5, and FIG. 7 is a partially enlarged view showing a "C" part of FIG. 3.

As shown in the drawings, the apparatus for preventing pollution of a groundwater borehole according to the first preferred embodiment includes: a first intake pipe 200 buried under the ground for forming a groundwater borehole communicating with a groundwater layer; a second intake pipe 210 fused integrally with the upper end of the first intake pipe 200, having the same diameter as the first intake pipe 200, and having a sealed type watertight cover 220; and an underwater motor pump 244 mounted inside the first intake pipe 200 and supported by the first intake pipe 200 for discharging the groundwater to the outside. The groundwater stored inside the first intake pipe 200 is pumped up by the motor pump 244 and transferred to a target place. It is preferable that a wire insertion hole 216 for mounting an electric wire 246 connected with the motor pump 244 is formed on the second intake pip 210, which is buried under the ground, and buried under the ground. The reference numeral 240 designates a water lifting pipe 240 for inducing the groundwater pumped up by the motor pump 244 to the outside, the reference numeral 230 designates a water level meter for connecting a groundwater level measuring pipe. In addition, the reference numeral X designates a groundwater piping system having an integral water meter, a pressure gauge, an exhalent device and a non-return valve for discharging the groundwater pumped by the motor pump 244 to the outside, and the reference numeral H designates a building for protecting the groundwater piping system X.

The apparatus for preventing pollution of a groundwater borehole according to the first preferred embodiment of the present invention further includes an induction pipe connector 260. The induction pipe connector 260 is watertightly mounted on the second intake pipe 210 and connected with the motor pump 244 and having a discharge path 262 for discharging the groundwater pumped up by the motor pump 244 to the outside. The induction pipe connector 260 includes a first connection socket 264 being in the form of a ']' shape for connecting the induction pipe connector 260 with the lifting pipe 240, and a second connection socket 266 watertightly mounted on the second intake pipe 200 for communicating the first connection socket 264 with the outside. The first and second connection sockets 264 and 266 discharge the groundwater pumped up by the motor pump 244 to the outside through the discharge path 262 formed therein. The induction pipe connector 260 is mounted to the second intake pipe 210 in balance by fixing means 270, and can discharge the groundwater lifted up through the lifting pipe 240 to the outside of a side of the second intake pipe 210 by induction of the first connection socket 264.

As shown in FIG. 4, the fixing means 270 are respectively mounted on a side surface of the induction pipe connector 260 and a side surface of the second intake pipe 210 faced with each other for supporting the induction pipe connector 260 to the second intake pipe in balance. The fixing means 270 includes a second protrusion 273 protruding from the induction pipe connector 260 and having an inclined front end 273a, and a second support protrusion 274 protruding from the second intake pipe 210 and having an inclined front end 274a corresponding with the inclined front end 273a of the second protrusion 273 in surface contact with each other. The second protrusion 273 and the second support protrusion 274 are coupled with each other in surface contact through the inclined front ends 273a and 274a, and the surface coupling can be maintained in stable by self-weight of the induction pipe connector 260 receiving the load of the motor pump 244. Thereby, the induction pipe connector 260 can support both sides of the motor pump 244 by the second protrusion 273 and the second support protrusion 274 coupled with each other in surface contact, and be watertightly mounted to the second intake pipe 210. In particular, the induction pipe connector 260 is mounted to the second intake pipe 210 in more closely contact since it is moved toward the discharge path 262 as much as an inclined angle when the second protrusion 273 and the second support protrusion 274 are coupled with each other in surface contact, and thereby, the induction pipe connector 260 can have so excellent water-tightness. Therefore, the present invention can prevent displacement occurring by supporting only a side of the heavy motor pump 244 like the prior arts, and prevent water leakage by maintaining the stable contact to the second intake pipe 210.

As shown in FIGS. 5 and 6, the fixing means 270 may include a first protrusion 271 protruding from the induction pipe connector 260 and having a downwardly bended front end 271a, and a first support protrusion 272 protruding from the second intake pipe 210 and having an upwardly bended front end 272a corresponding and matched with the downwardly bended front end 271a of the first protrusion 271. The induction pipe connector 260 can be mounted to the second intake pipe 210 and support both sides of the motor pump 244 by the corresponding match between the first protrusion 271 and the first support protrusion 272. Therefore, the present invention can prevent displacement occurring by supporting only a side of the heavy motor pump 244 like the prior arts, and prevent water leakage by maintaining the stable contact to the second intake pipe 210.

Meanwhile, the apparatus for preventing pollution of a groundwater borehole according to the first preferred embodiment includes air suction valve 280a and an exhaust valve 280b. The air suction valve 280a and the exhaust valve 280b are mounted on a side wall of the second intake pipe 210 and serve to uniformly control and maintain the inside pressure of the intake pipes 200 and 210 sealed by the watertight cover 220. The air suction valve 280a and the exhaust valve 280b are connected with the second intake pipe 210 by the medium of a pipe 290 connected to the second intake pipe 210 adjacently with the induction pipe connector 260. The air suction valve 280a and the exhaust valve 280b are connected with the second intake pipe 210 by being respectively connected to branch pipes 291a and 291b branched from the pipe 290 in a "T" shape. It is preferable that the air suction valve 280a and the exhaust valve 280b are mounted inside the building H installed on the ground for protecting the groundwater piping facility X.

The air suction valve 280a has an automatic air suction valve 282 for inhaling the outside air into the intake pipes 200 and 210 in order to relieve a vacuum condition due to a drop of the water level inside the first intake pipe 200, and the exhaust valve 280b has an automatic valve for discharging the inside air of a high pressure state inside the intake pipes 200 and 210 to the outside in order to relieve high pressure due to a rise of the water level inside the first intake pipe 200.

That is, if the motor pump 244 does not pump up the groundwater from the intake pipes 200 and 210, the groundwater is stored in the intake pipes 200 and 210 in a high water level. In the above condition, if the motor pump 244 is operated and pumps up the groundwater, the inside of the intake pipes 200 and 210 is in a vacuum state due to the gradually dropping water level. Such vacuum condition prevents the operation of the motor pump 244 from pumping up the groundwater smoothly. At this time, the automatic air suction valve 282 of the air suction valve 280a senses the vacuum condition, opens an air path, and inhales the outside air through the opened air path in order to supply the outside air to the intake pipes 200 and 210 through the pipe 290, thereby relieving the vacuum condition inside the intake pipes 200 and 210. At this time, the air path of the exhaust valve 280b is closed.

However, if the motor pump 244 does not pump up the groundwater again, the groundwater is gradually stored in the intake pipes 200 and 210 in a high water level. While, the groundwater is gradually stored in the intake pipes 200 and 210 in a high water level, the inside air formed inside the intake pipes 200 and 210 is pushed, and then, the upper portion of the intake pipes 200 and 210 are in a high pressure state. Since the high pressure has an influence on the mounted state of each components of this apparatus, the exhaust valve 280a opens the close air path in order to discharge the inside air of the high pressure from the intake pipes 200 and 210. At this time, the air path of the automatic air suction valve 282 of the air suction valve 280a is closed.

By the above operation principle, the air suction valve 280a and the exhaust valve 280b uniformly control the internal pressure of the intake pipes 200 and 210 sealed by the watertight cover 220, thereby protecting the mounted state of each components and facilitating the pumping of the motor pump 244. The operation of the air suction valve 280a and the exhaust valve 280b is repeated according to the operation of the motor pump 244.

Furthermore, the automatic air suction valve 282 of the air suction valve 280a includes a first ball top 283 having a first float 283a, and a gasproof filter 284 connected to the first ball top 283. The first ball top 283 closes the opened air path of the automatic air suction valve 282 by operation of the first float 283a due to the rise of the water level even though the automatic air suction valve 282 is submerged under water in a state where the air path of the automatic air suction valve 282 is opened in time of an unusual change of weather or in flood time, thereby preventing pollutants of the ground surface water from being induced into the intake pipes 200 and 210 through the automatic air suction valve 282.

The gasproof filter 284 filters various pollutants floating in the air in a state where the air path of the automatic air suction valve 282 is opened and serves to prevent inflow of the pollutants into the intake pipes 200 and 210.

Figure 8:
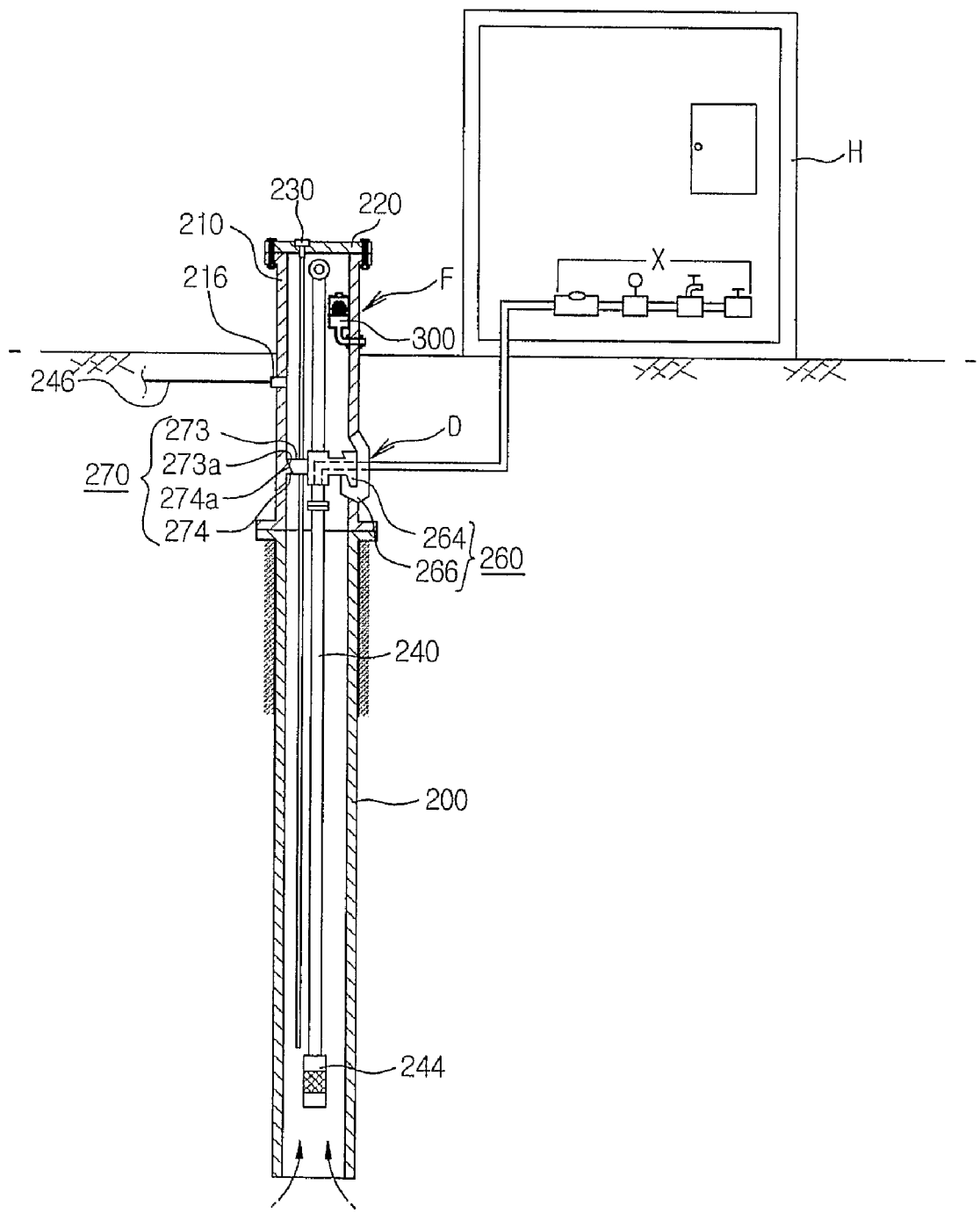
FIG. 8 is a sectional view of an apparatus for preventing pollution of a groundwater borehole according to a second preferred embodiment of the present invention.
Figure 9:
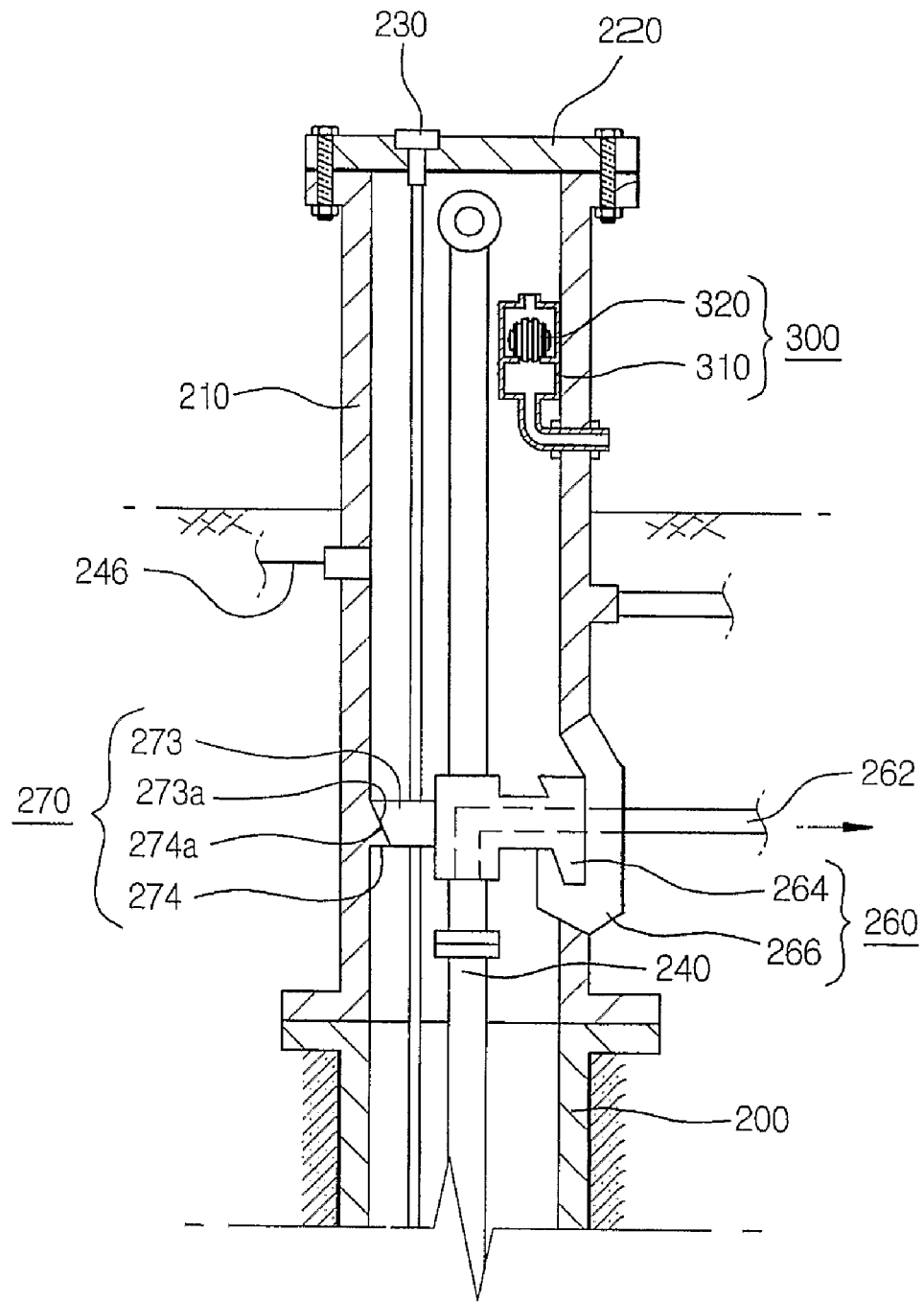
FIG. 9 is a partially enlarged view showing a "D" part of FIG. 8.
Figure 10:
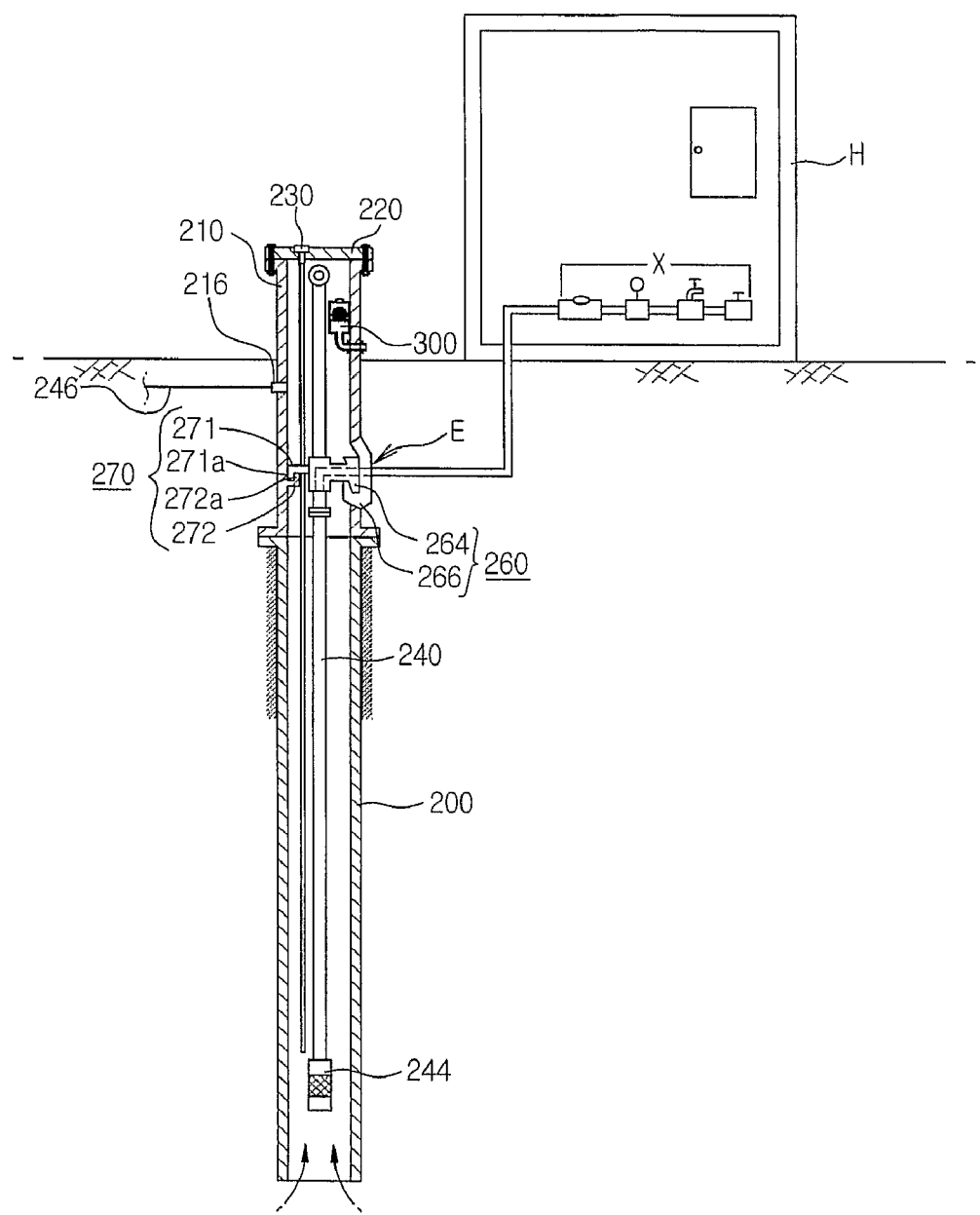
FIG. 10 is a sectional view of a modification of the apparatus for preventing pollution of a groundwater borehole according to the second preferred embodiment of the present invention.
Figure 11:
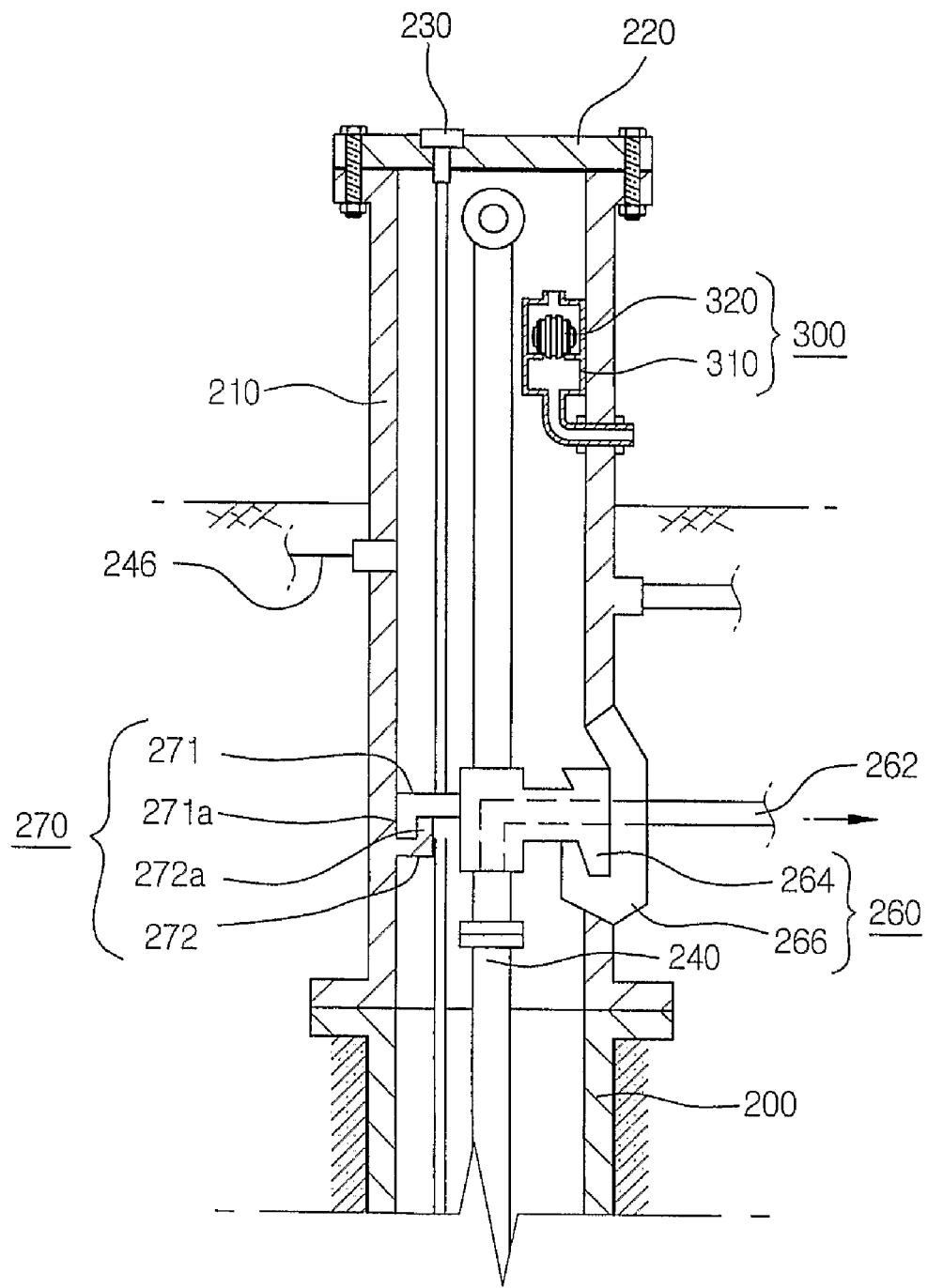
FIG. 11 is a partially enlarged view showing an "E" part of FIG. 10.
Figure 12:
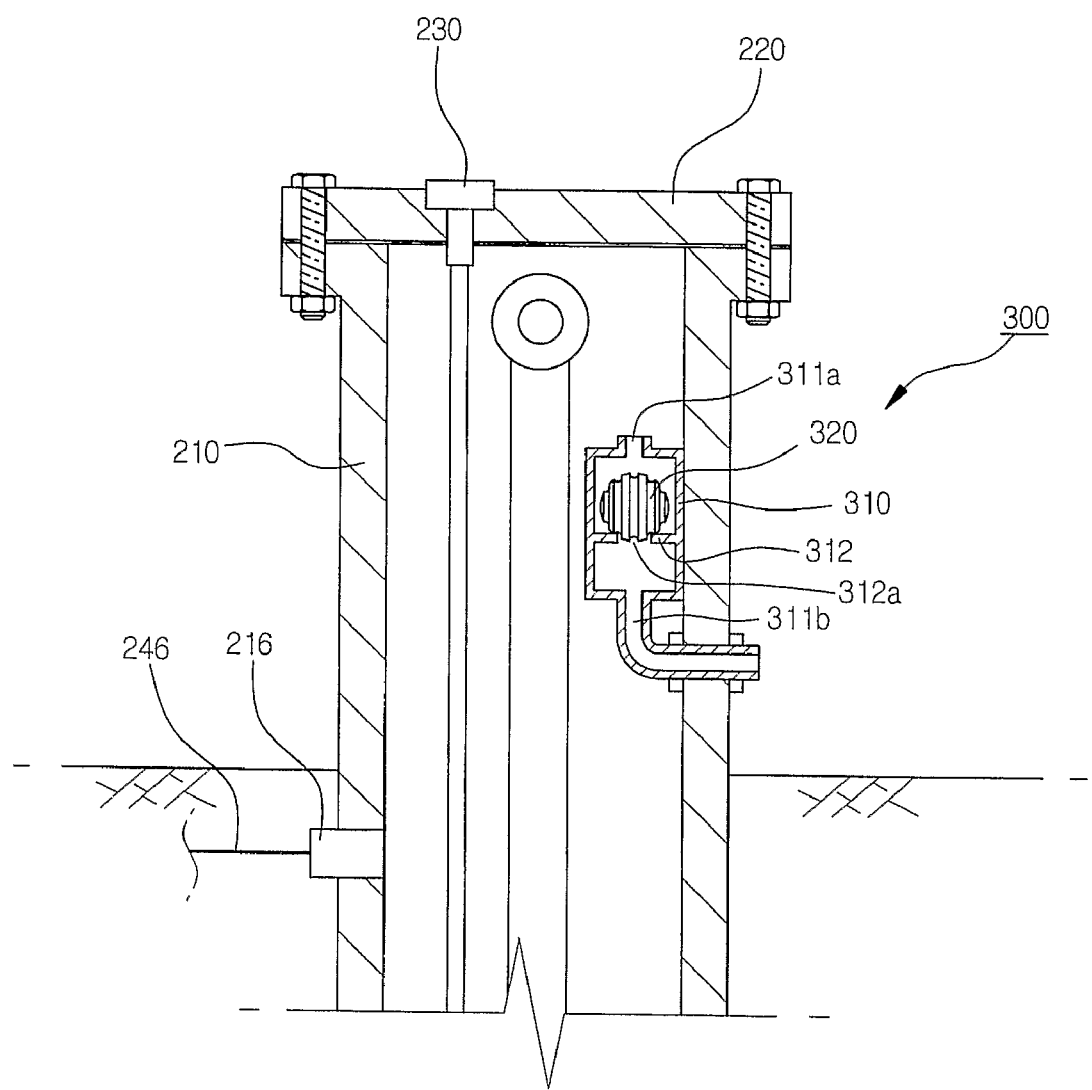
FIG. 12 is a partially enlarged view showing an "F" part of FIG. 8.
Figure 13:
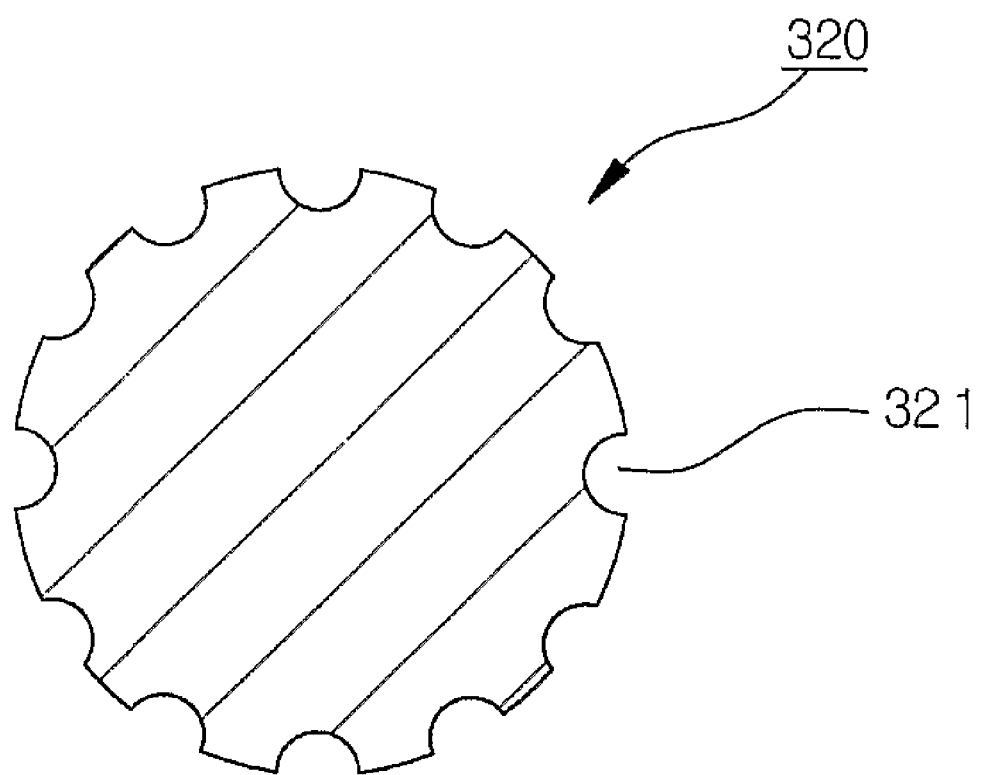
FIG. 13 is a sectional view of a float of a ball top of the apparatus for preventing pollution of a groundwater borehole according to the second preferred embodiment of the present invention.
Figure 14:
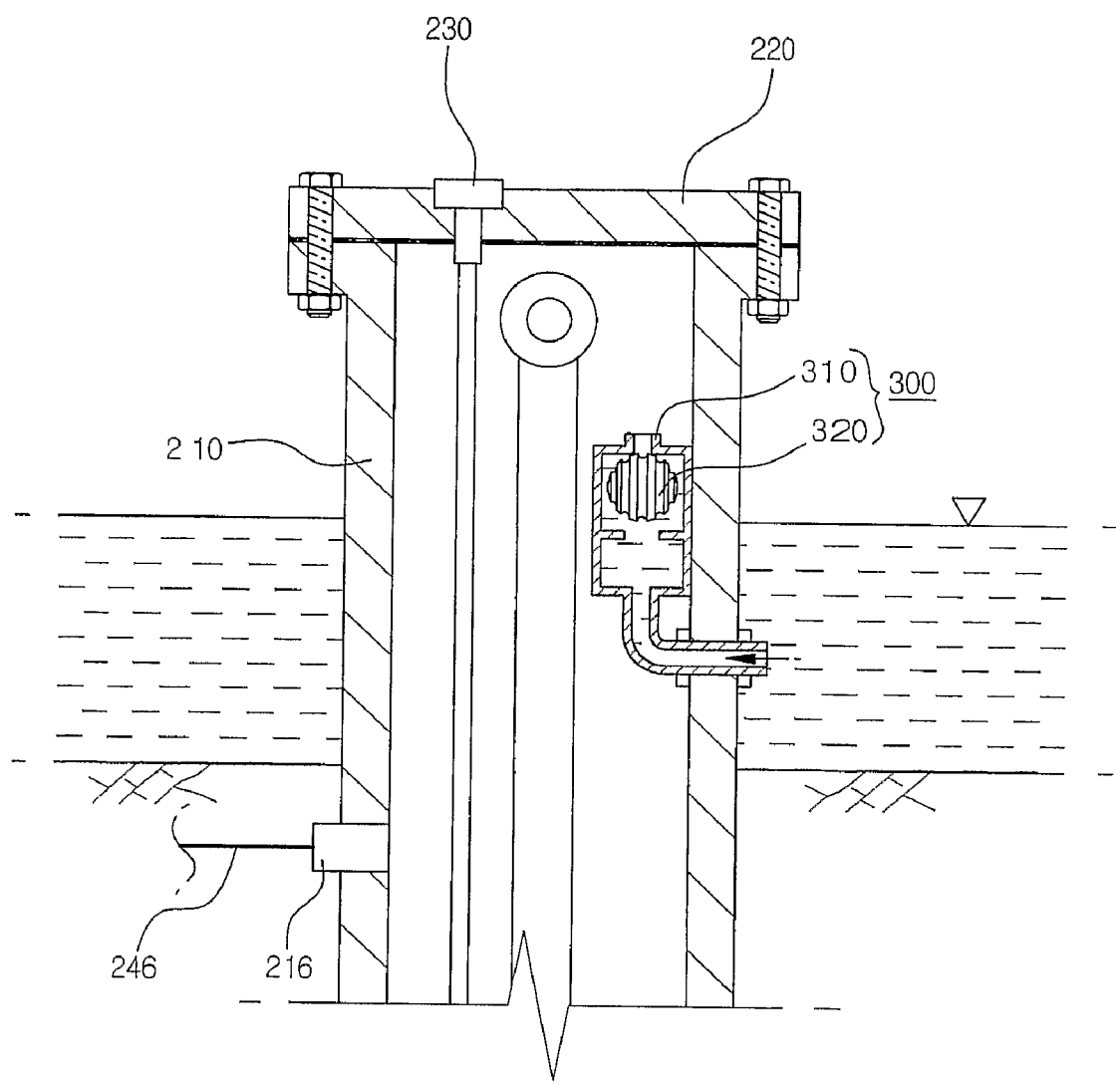
FIG. 14 is a view showing an operation state of FIG. 12.

FIG. 8 is a sectional view of an apparatus for preventing pollution of a groundwater borehole according to a second preferred embodiment of the present invention, FIG. 9 is a partially enlarged view showing a "D" part of FIG. 8, FIG. 10 is a sectional view of a modification of the apparatus for preventing pollution of a groundwater borehole according to the second preferred embodiment of the present invention, FIG. 11 is a partially enlarged view showing an "E" part of FIG. 10, FIG. 12 is a partially enlarged view showing an "F" part of FIG. 8, FIG. 13 is a sectional view of a float of a ball top of the apparatus for preventing pollution of a groundwater borehole according to the second preferred embodiment of the present invention, and FIG. 14 is a view showing an operation state of FIG. 12.

As shown in the drawings, the apparatus for preventing pollution of a groundwater borehole according to the second preferred embodiment of the present invention has a structure similar with that of the apparatus for preventing pollution of a groundwater borehole according to the first preferred embodiment. That is, the apparatus for preventing pollution of a groundwater borehole according to the second preferred embodiment is different from the apparatus for preventing pollution of a groundwater borehole according to the first preferred embodiment in that it has a second ball top 300 mounted inside the second intake pipe 210 in lieu of the air suction valve 280a and the exhaust valve 280b of the first embodiment, but excepting the above structure, the apparatus for preventing pollution of a groundwater borehole according to the second preferred embodiment has the same structure as the apparatus for preventing pollution of a groundwater borehole according to the first preferred embodiment. Therefore, hereinafter, only the second ball top 300 will be described, and the other components which are equal to those of the first preferred embodiment of the present invention will not be described.

The second ball top 300 includes: a hollow casing 310 mounted on the inner wall surface of the second intake pipe 210 and having an air path for connecting the inside and the outside of the second intake pipe 210; and a second float 320 located inside the casing 310 and having a number of holes 321 formed on the outer circumference thereof for closing the air path of the opened casing 310 according to the water level of the outside.

It is preferable that the casing 310 is mounted inside the second intake pipe 210 above the induction pipe connector 260. The casing 310 has first ventilation holes 311a and 311b formed on the upper and lower ends thereof, and the air path formed by fixedly mounting the lower ventilation hole 311b on the inner wall surface of the second intake pipe 210 in communication with the outside for connecting the inside and outside of the second intake pipe 210. Moreover, the casing 310 has a partition 312 having a second ventilation hole 312a formed at the center thereof for dividing the inside into two spaces, and the second float 320 is located in the upper space of the two spaces.

The second float 320 has a size to sufficiently close the first and second ventilation holes 311a and 312a and is located inside the casing 310. In a state where the second ventilation hole 312a is closed, ventilation of the second intake pipe 210 is performed through a number of holes 321 formed on the outer circumference thereof (see FIG. 13).

Therefore, when the inside of the intake pipes 200 and 210 are in a vacuum state by operation of the motor pump 244, the outside air is induced into the intake pipes 200 and 210 through the first ventilation hole 311a via the first and second ventilation holes 311b and 312a of the casing 310 and the holes 321 of the second float 320 closing the second ventilation hole 312a so as to relieve the vacuum state. In addition, the inside air of the high pressure formed at the upper portion of the intake pipes 200 and 210 by stop of the motor pump 244 is discharged to the outside in the opposite course of the above course so as to relieve the high pressure state. Such flow of the air is repeated according to the operation of the motor pump 244, and uniformly controls the inside pressure of the intake pipes 200 and 210 closed by the watertight cover 220, thereby protecting the mounted state of each components and facilitating pumping of the motor pump 244.

Meanwhile, as shown in FIG. 14, the present invention closes the first ventilation hole 311a of the casing by a rise of the second float 320 due to the rise of the water level even though the air path of the casing 310 is submerged under water and the water is induced into the casing 310 through the first ventilation hole 311b in a state where the air path of the casing 310 is opened in time of an unusual change of weather or in flood time, thereby preventing pollutants of the ground surface water from being induced into the intake pipes 200 and 210.

INDUSTRIAL APPLICABILITY

As described above, the apparatus for preventing pollution of a groundwater borehole according to the present invention can increase water-tightness by supporting both sides of the motor pump, which pumps up the groundwater, in balance.

Furthermore, the present invention can smoothly pump up water by effectively coping with a change of the inside air according to a change of water level inside the intake pipes, and safely manage groundwater by effectively preventing introduction of pollutants into the intake pipes. Moreover, the present invention can bury pipes under the ground and prevent freezing of the pipes by inducing a discharge direction of groundwater to the outside of a side of the intake pipes through a connector for supporting the underwater motor pump located inside the intake pipes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention

What is claimed is:

1. An apparatus for preventing pollution of a groundwater borehole comprising:
    a first intake pipe for forming a groundwater borehole;
    a second intake pipe fluid-communicatively coupled to the first intake pipe and closing an opening of the first intake pipe;
    an underwater motor pump located inside the first intake pipe for discharging groundwater from the intake pipes to the outside;
    an induction pipe connector mounted inside the second intake pipe and connected with the motor pump for supporting the motor pump, the induction pipe connector having a discharge path for discharging the groundwater pumped up by the motor pump to the outside of a side of the second intake pipe;

fixing means respectively mounted on a side surface of the induction connector and a side surface of the second intake pipe directed to each other for supporting the induction pipe connector to the second intake pipe in balance; and a pressure controlling part mounted on the outer circumferences of the intake pipes in such a manner as to communicate with the second intake pipe via a portion adjacent to the induction pipe connector for uniformly controlling the inside pressure of the intake pipes.

2. An apparatus for preventing pollution of a groundwater borehole according to claim 1, wherein the fixing means includes a first protrusion protruding from the induction pipe connector and having a bended front end, and a first support protrusion protruding from the second intake pipe and having a bended front end corresponding and matched with the bended front end of the first protrusion.

3. An apparatus for preventing pollution of a groundwater borehole according to claim 1, wherein the fixing means includes a second protrusion protruding from the induction pipe connector and having an inclined front end, and a second support protrusion protruding from the second intake pipe and having an inclined front end corresponding with the inclined front end of the second protrusion in surface contact with each other.

4. An apparatus for preventing pollution of a groundwater borehole according to claim 1, wherein the pressure controlling part includes: an air suction valve connected with the second intake pipe and having an automatic air suction valve for inhaling and supplying the outside air into the intake pipes in order to relieve a vacuum condition due to a drop of the water level inside the first intake pipe, and an exhaust valve 280*b* connected with the second intake pipe in parallel with the air suction valve and having an automatic valve for discharging the inside air of a high pressure state inside the intake pipes to the outside in order to relieve high pressure due to a rise of the water level inside the first intake pipe.

5. An apparatus for preventing pollution of a groundwater borehole according to claim 4, wherein the air suction valve further includes a first ball top connected with the automatic air suction valve and having a first float for closing an opened air path of the automatic air suction valve according to the water level of the outside, and a gasproof filter connected with the first ball top.

6. An apparatus for preventing pollution of a groundwater borehole comprising:

a first intake pipe for forming a groundwater borehole;

a second intake pipe fluid-communicatively coupled to the first intake pipe and closing an opening of the first intake pipe;

an underwater motor pump located inside the first intake pipe for discharging groundwater from the intake pipes to the outside;

an induction pipe connector mounted inside the second intake pipe and connected with the motor pump for supporting the motor pump, the induction pipe connector having a discharge path for discharging the groundwater pumped up by the motor pump to the outside of a side of the second intake pipe;

fixing means respectively mounted on a side surface of the induction connector and a side surface of the second intake pipe directed to each other for supporting the induction pipe connector to the second intake pipe in balance; and a second ball top mounted inside the upper portion of the second intake pipe adjacently to the induction pipe connector for connecting the inside and outside of the second intake pipe in order to uniformly control the inside pressure of the intake pipes.

7. An apparatus for preventing pollution of a groundwater borehole according to claim 6, wherein the fixing means includes a first protrusion protruding from the induction pipe connector and having a bended front end, and a first support protrusion protruding from the second intake pipe and having a bended front end corresponding and matched with the bended front end of the first protrusion.

8. An apparatus for preventing pollution of a groundwater borehole according to claim 6, wherein the fixing means includes a second protrusion protruding from the induction pipe connector and having an inclined front end, and a second support protrusion protruding from the second intake pipe and having an inclined front end corresponding with the inclined front end of the second protrusion in surface contact with each other.

9. An apparatus for preventing pollution of a groundwater borehole according to claim 6, wherein the ball top includes a hollow casing mounted on the inner wall surface of the second intake pipe and having an air path for connecting the inside and outside of the second intake pipe, and a second float located inside the casing and having a number of holes formed on the outer circumference thereof for closing the air path of the opened casing according to the water level of the outside, the holes communicating with the air path of the casing.

* * * * *